United States Patent Office 3,838,162
Patented Sept. 24, 1974

3,838,162
3-LOWER ALKYL-5-[o-(ω-AMINO-ALKOXY)-PHENOXYMETHYL]-ISOXAZOLES AND SALTS THEREOF
Roland Maier and Erich Muller, Biberach an der Riss, Germany, assignors to Boehringer Ingelheim GmbH, Ingelheim am Rhein, Germany
No Drawing. Filed Sept. 10, 1971, Ser. No. 179,522
Claims priority, application Germany, Sept. 11, 1970, P 20 45 050.4; June 16, 1971, P 21 29 803.3
Int. Cl. C07d 85/22
U.S. Cl. 260—307 H                7 Claims

ABSTRACT OF THE DISCLOSURE

Compounds of the formula

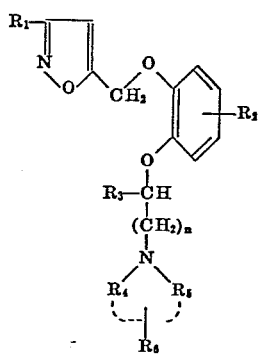

wherein
$R_1$ is alkyl of 1 to 3 carbon atoms,
$R_2$ is hydrogen, halogen or straight or branched alkyl of 1 to 4 carbon atoms,
$R_3$ is hydrogen or methyl,
$R_4$ and $R_5$, which may be identical to or different from each other, are each hydrogen, straight or branched alkyl of 1 to 6 carbon atoms or, together with each other and the nitrogen atom to which they are attached, morpholino, piperazino, pyrrolidino or piperidino,
$R_6$ is hydrogen or methyl, and
$n$ is an integer from 1 to 3, inclusive,
and non-toxic, pharmacologically acceptable acid addition salts thereof; the compounds as well as their salts are useful as hypotensives and sedatives.

This invention relates to novel 3-lower alkyl-5-[o-(ω-amino-alkoxy)-phenoxymethyl]-isoxazoles and non-toxic acid addition salts thereof, as well as to methods of preparing these compounds.

More particularly, the present invention relates to a novel class of 3-alkyl-5-aryloxymethyl-isoxazoles represented by the formula

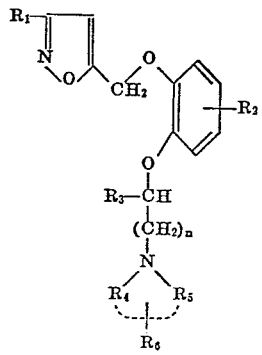

(I)

wherein
$R_1$ is alkyl of 1 to 3 carbon atoms,
$R_2$ is hydrogen, halogen or straight or branched alkyl of 1 to 4 carbon atoms,
$R_3$ is hydrogen or methyl,
$R_4$ and $R_5$, which may be identical to or different from each other, are each hydrogen, straight or branched alkyl of 1 to 6 carbon atoms or, together with each other and the nitrogen atom to which they are attached, morpholino, piperazino, pyrrolidino or piperidino,
$R_6$ is hydrogen or methyl, and
$n$ is an integer from 1 to 3, inclusive, and non-toxic, pharmacologically acceptable acid addition salts thereof.

The compounds embraced by formula I may be prepared by the following methods:

Method A

By subjecting a 3-lower alkyl-5-[(o-hydroxy)-phenoxymethyl]-isoxazole of the formula

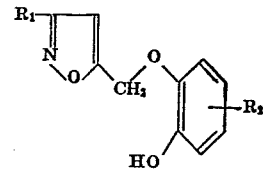

(II)

wherein $R_1$ and $R_2$ have the same meanings as in formula I, to a condensation reaction with an amine of the formula

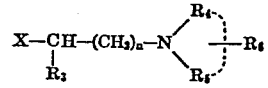

(III)

wherein $R_3$, $R_4$, $R_5$, $R_6$ and $n$ have the same meanings as in formula I and X is a reactive group, such as halogen or sulfonyloxy.

The reaction is preferably carried out in the presence of an inert solvent or suspension medium, such as water, ethanol, dioxane, dimethylformamide, dimethylsulfoxide of a ketone, at a temperature between 20 and 150° C., and in the presence of a basic condensation agent, such as an alkali metal or alkaline earth metal hydroxide, an alkali metal or alkaline earth metal carbonate, an alkali metal or alkaline earth metal alcoholate, or an alkali metal or alkaline earth metal hydride.

Method B

By reacting a 3-lower alkyl-5-[(o-alkoxy)-phenoxymethyl]-isoxazole of the formula

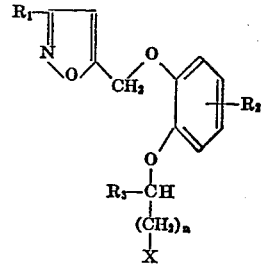

(IV)

wherein $R_1$, $R_2$, $R_3$ and $n$ have the same meanings as in formula I and X is a reactive group, such as halogen or sulfonyloxy, with an amine of the formula

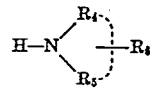

(V)

wherein $R_4$, $R_5$ and $R_6$ have the same meanings as in formula I.

The reaction is preferably carried out in the presence of an organic solvent and of an organic or inorganic base at a temperature between 20 and 150° C. Depending upon the boiling point of the amine reactant (V), the reaction is performed at atmospheric or elevated pressure.

Examples of suitable organic solvents are lower alkanols, hydrocarbons, dimethylformamide and dimethylsulfoxide; however, a sufficient excess of the amine reactant above the stoichiometrically required amount may also serve as the solvent medium.

Examples of suitable organic or inorganic bases are difficulty alkylatable tertiary organic bases, alkali metal or alkaline earth metal hydroxides, and alkali metal or alkaline earth metal carbonates.

The compounds of the formula I above are organic bases and therefore form acid addition salts with inorganic or organic acids. Examples of non-toxic, pharmacologically acceptable acid addition salts are those formed with hydrochloric acid, hydrobromic acid, sulfuric acid, acetic acid, citric acid, tartaric acid, 8-chlorotheophylline or the like.

The starting compounds of the formula II for method A may be prepared by monoalkylation of a pyrocatechol of the formula

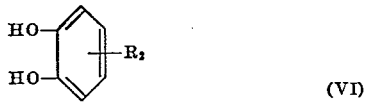

wherein $R_2$ has the same meanings as in formula I, with a 3-lower alkyl-5-halomethyl-isoxazole of the formula

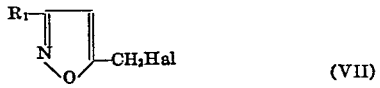

wherein $R_1$ has the same meanings as in formula I and Hal is halogen.

A 3-lower-alkyl-5-halomethyl-isoxazole, in turn, may be prepared by methods described in the literature, i.e. by cycloaddition of a nitrile oxide of the formula $$R_1-C\equiv N\rightarrow O \qquad (VIII)$$

wherein $R_1$ has the same meanings as in formula I, with a propargyl halide. The reactions are performed in analogy to those described by C. Grundmann under the title "Methods for the Preparation and Transformation of Nitrile Oxides" in Houben-Weyl, Methoden der Organischen Chemie, Vol. 10/3, pages 841–870, published by Georg Thieme Verlag, Stuttgart, Germany (1965); and by H. G. Sen et al. in J. Med. Chem. 9, 431–433.

The starting compounds of the formula IV for method B, wherein X is halogen, may be prepared by reacting a compound of the formula II with an α,ω-dihalo-alkane of the formula

wherein $R_3$ has the same meanings as in formula I and X and Y, which may be indentical to or different from each other, are each halogen.

If X in formula IV is sulfonyloxy, these starting compounds are prepared by first forming the corresponding alcohol of the formula

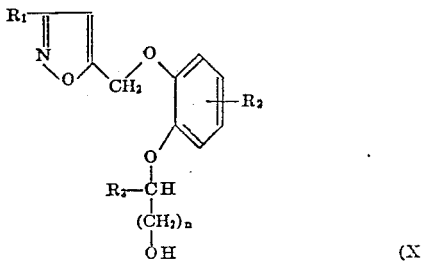

wherein $R_1$, $R_2$, $R_3$ and $n$ have the same meanings as in formula I, and subsequently reacting the alcohol with sulfonic acid chloride.

An alcohol of the formula X, in turn, may be prepared by reacting a compound of the formula II with a compound of the formula IX wherein Y is halogen and X is hydroxyl.

The compounds defined by formula III above are described in the literature.

The following examples further illustrate the present invention and will enable others skilled in the art to understand it more completely. It should be understood, however, that the invention is not limited solely to the particular examples given below.

Preparation of starting compounds:

EXAMPLE A

3-Methyl-5-bromomethyl-isoxazole

A mixture consisting of 278 gm. (2.0 mol) of phenyl isocyanate, 119 gm. (1.0 mol) of propargyl bromide and 450 cc. of benzene was heated to 70° C. and, while stirring the same at that temperature, a mixture consisting of 75 gm. (1.0 mol) of nitro-ethane, 12 gm. (0.12 mol) of N-ethyl-diisopropylamine and 180 cc. of benzene was added dropwise thereto. Thereafter, the resulting mixture was heated at its boiling point until cessation of the evolution of carbondioxide, allowed to cool, filtered to separate the precipitated diphenylurea, and the benzene was evaporated from the filtrate. Fractional distillation of the residue in vacuo yielded 122 gm. (69% of theory) of 3-methyl-5-bromomethyl-isoxazole, b.p. 53° C. at 0.4 mm. Hg.

Using an analogous procedure, the following additional 3-lower alkyl-5-halomethyl-isoxazoles were prepared:

(a) *3-Ethyl-5-bromomethyl-isoxazole*, a slightly yellow liquid, b.p. 46–48° C. at 0.08 mm. Hg, from 1 nitropropane and propargyl bromide.

(b) *3-n-Propyl-5-bromomethyl-isoxazole*, b.p. 50–51° C. at 0.1 mm. Hg, from 1-nitrobutane and propargyl bromide.

(c) *3-Methyl-5-chloromethyl-isoxazole*, b.p. 75–78° C. at 13 mm. Hg, from nitroethane and propargyl chloride.

EXAMPLE B

3-Methyl-5-(o-hydroxy-phenoxymethyl)-isoxazole

A solution of 33 gm. (0.3 mol) of pyrocatechol in 75 cc. of ethanol was heated to 70° C. and, while maintaining that temperature and stirring the solution, small portions of a solution of 7.2 gm. (0.3 mol) of sodium in 115 cc. of ethanol were added alternately with small portions of 52.8 gm. (0.3 mol) of 3-methyl-5-bromomethyl-isoxazole in 150 cc. of ethanol. Thereafter, the resulting reaction solution was heated for three hours at its boiling point and then allowed to stand overnight at 0° C. The crystalline precipitate formed thereby was filtered off, the filtrate was evaporated, and the residue was stirred with water. The insoluble matter was separated and admixed with sodium hydroxide, the insoluble matter was filtered off, the filtrate was acidified with hydrochloric acid, the acid solution was extracted with ether. The ether extract was evaporated, leaving 29.5 gm. (48% of theory) of 3-methyl-5-(o-hydroxy-phenoxymethyl)-isoxazole, m.p. 89–90° C.

Using a analogous procedure, the following additional starting compounds of the formula II were prepared:

(a) *3-Ethyl-5-(o-hydroxy-phenoxymethyl)-isoxazole*, $R_f$ = 0.5 (aluminum oxide/ethyl acetate), from pyrocatechol and 3-ethyl-5-bromomethyl-isoxazole.

(b) *3-n-Propyl-5-(o-hydroxy-phenoxymethyl)-isoxazole*, $R_f$ = 0.52 (aluminum oxide/ethyl acetate), from pyrocatechol and 3-n-propyl-5-bromomethyl-isoxazole.

(c) *3-Methyl-5-[2'-hydroxy-4(5)-chloro-phenoxymethyl]-isoxazole*, $R_f$ = 0.6 (aluminum oxide/ethyl acetate), from 3-methyl-5-bromomethyl-isoxazole and 4-chloropyrocatechol.

(d) *3-Methyl-5-[2'-hydroxy-4(5)-bromo-phenoxymethyl]-isoxazole*, $R_f=0.65$ (aluminum oxide/ethyl acetate), from 3-methyl-5-bromomethyl-isoxazole and 4-bromo-pyrocatechol.

(e) *3-Methyl-5-[2'-hydroxy-4(5)-methyl-phenoxymethyl]-isoxazole*, $R_f=0.55$ (silicagel/ethyl acetate), from 3-methyl-5-bromomethyl-isoxazole and 4-methylpyrocatechol.

(f) *3-Methyl-5-[2'-hydroxy-4(5)-tert.butyl-phenoxymethyl]-isoxazole*, m.p. 76–77° C. (ethanol/petroleum ether), from 3-methyl-5-bromomethyl-isoxazole and 4-tert.butyl-pyrocatechol.

EXAMPLE C

3-Methyl-5-[o-(β-p-tolylsulfonyloxy-ethoxy)-phenoxymethyl]-isoxazole (a) 40 gm. (0.0195 mol) of 3-methyl-5-(o-hydroxy-phenoxymethyl)-isoxazole were dissolved in 200 cc. of dioxane, and 4.7 gm. (0.195 mol) of sodium hydride were added to the solution. After the evolution of hydrogen had subsided, 24.4 gm. (0.195 mol) of β-bromo-ethanol were added, the mixture was heated at 80° C. for two hours, the sodium bromide which had precipitated was filtered off, and the filtrate was evaporated. The residue was taken up in water, the aqueous solution was extracted with chloroform, and the extract solution was dried over sodium sulfate, stirred with some activated charcoal, filtered and evaporated. The residue was recrystallized from benzene, yielding 35.0 gm. (72% of theory) of 3-methyl-5-[o-(β-hydroxy-ethoxy) - phenoxymethyl]-isoxazole, m.p. 86–87° C.

(b) 24 gm. (0.1 mol) of this product were dissolved in 150 cc. of pyridine and, while stirring and cooling the solution at −5° C., 21.0 gm. (0.11 mol) of p-toluenesulfonic acid chloride were added thereto in small portions. Thereafter, the reaction mixture was stirred for three hours at −5 to 0° C. and was then poured into ice water. The initially oily precipitate formed thereby became crystalline upon scratching. The crystalline substance was filtered off, the filtrate was extracted with chloroform, the filter cake was dissolved in chloroform, and the two chloroform solutions were combined, dried over sodium sulfate and evaporated. The residue was recrystallized from benzene/petroleum ether, yielding 27.8 gm. (69% of theory) of 3-methyl-5[o-(β-p-tolylsulfonyloxy-ethoxy)-phenoxymethyl] - isoxazole, m.p. 74–75° C.

EXAMPLE D

3-Methyl-5-[o-(γ-chloro-n-propoxy)-phenoxymethyl]-isoxazole

A solution of 6.15 gm. (0.03 mol) of 3-methyl-5-(o-hydroxy-phenoxymethyl)-isoxazole in 70 cc. of dioxane was admixed with 0.75 gm. (0.03 mol) of sodium hydride, and the mixture was heated for two hours at 50° C. Thereafter, the reaction mixture was cooled to 10° C., and then a solution of 4.7 gm. (0.03 mol) of 1-bromo-3-chloro-propane in 15 cc. of dioxane was added thereto. The resulting mixture was heated for three hours at 80° C., then evaporated, the residue was taken up in a small amount of water, and the aqueous solution was extracted first with ether and then with chloroform. The combined extracts were dried over sodium sulfate, the solvent was evaporated, and the residue was freed from unreacted 1-bromo-3-chloro-propane by heating it in a high vacuum on a water bath at 90° C., leaving 8.5 gm. of a brown oil which was identified to be raw 3-methyl-5-[o-(γ-chloro - n - propoxy) - phenoxymethyl]-isoxazole.

Using an analogous procedure, the following additional oily raw starting compounds of the formula IV were prepared:

(a) *3-Methyl-5-[o-(β-bromo-ethoxy) - phenoxymethyl]-isoxazole*, $R_f=0.6$ (aluminum oxide/ethyl acetate), from 3-methyl-5-(o-hydroxy-phenoxymethyl)-isoxazole and 1,2-dibromo-ethane.

(b) *3-Ethyl-5-[o-(β-bromo - ethoxy) - phenoxymethyl]-isoxazole*, $R_f=0.55$ (aluminum oxide/ethyl acetate), from 3-ethyl-5-(o-hydroxy-phenoxymethyl) - isoxazole and 1,2-dibromo-ethane.

(c) *3-Methyl-5-[2'(β-bromo-ethoxy) - 4'(5') - chloro-phenoxymethyl]-isoxazole*, $R_f=0.58$ (aluminum oxide/ethyl acetate), from 3-methyl-5-[2'-hydroxy-4'(5')-chloro-phenoxymethyl] - isoxazole and 1,2 - dibromo-ethane.

(d) *3-Methyl-5-[2'-(4''-bromo - n - butoxy) - phenoxymethyl] - isoxazole*, $R_f=0.6$ (aluminum oxide/ethyl acetate), from 3-methyl-5-(o-hydroxy - phenoxymethyl)-isoxazole and 1,4-dibromo-n-butane.

(e) *3-Methyl-5-[2'-(β-bromo-ethoxy) - 4'(5') - methyl-phenoxymethyl]-isoxazole*, $R_f=0.55$ (aluminum oxide/ethyl acetate), from 3-methyl-5-[2' - hydroxy - 4'(5')-methyl-phenoxymethyl]-isoxazole and 1,2 - dibromo-ethane.

Preparation of end products of the formula I:

EXAMPLE 1

3-Methyl-5-[o-(β - dimethylamino - ethoxy) - phenoxymethyl]-isoxazole, its hydrochloride and its citrate by method A 10.3 gm. (0.05 mol) of 3 - methyl - 5 - (o - hydroxy-phenoxymethyl)-isoxazole were dissolved in 100 cc. of dioxane and, while stirring the solution, 1.2 gm. (0.05 mol) of sodium hydride were added thereto in small portions. Subsequently, 5.4 gm. (0.05 mol) of β-dimethylamino-ethyl chloride were added dropwise to the mixture, and then the reaction mixture was heated for three hours at 70° C. Thereafter, the reaction solution was poured into ice water, the aqueous phase was separated and acidified with hydrochloric acid, the acidic solution was extracted with ether, and the ethereal extract was discarded. The acidic aqueous phase was made alkaline with sodium hydroxide and extracted with ether, and the ether extract was dried over sodium sulfate and then evaporated. The residue, raw 3-methyl-5 - [o - (β - dimethylamino-ethoxy) - phenoxymethyl] - isoxazole, was taken up in ethanol, the resulting solution was acidified with ethereal hydrochloric acid, and the crystalline precipitate formed thereby was collected and recrystallized from ethanol/acetone, yielding 9.4 gm. (60% of theory) of the compound of the formula

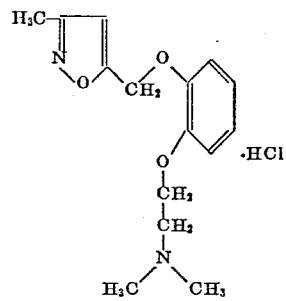

having a melting point of 118–119° C.

*Analysis:* $C_{15}H_{21}N_2O_3Cl$; mol. wt. 312.8
Calculated: C—57.52%; H—6.76%; N—8.95%; Cl—11.34%
Found: C—57.70%; H—6.82%; N—8.90%; Cl—11.25%

The free base, liberated from the hydrochloride with amonia, had a melting point of 46–47° C. after recrystallization from a mixture of ethanol and petroleum ether.

The citrate, obtained by treating the free base with ethanolic citric acid, had a melting point of 81–82° C. after recrystallization from ethanol/acetone.

EXAMPLE 2

Using a procedure analogous to that described in Example 1, *3-methyl-5-[2'-(γ-dimethylamino - n - propoxy)-phenoxymethyl] - isoxazole* and its hydrochloride, m.p. 103–105° C. (recrystallized from ethanol/ether), were prepared from 3-methyl-5-[2' - hydroxy - phenoxymethyl] - isoxazole and 3 - dimethylamino - n - propyl chloride.

EXAMPLE 3

Using a procedure analogous to that described in Example 1, *3-methyl-5-[2'(β - dimethylamino-ethoxy)-4'(5')-chloro-phenoxymethyl]-isoxazole* and its hydrochloride, m.p. 164–165° C. were prepared from 3-methyl-5-[2'-hydroxy-4'(5')-chloro-phenoxymethyl]-isoxazole and β-dimethylamino-ethyl chloride.

EXAMPLE 4

Using a procedure analogous to that described in Example 1, *3-methyl - 5 - [2'-(β-dimethylamino-ethoxy)-4'(5')-bromo-phenoxymethyl]-isoxazole* and its hydrochloride, m.p. 180° C. were prepared from 3-methyl-5-[2'-hydroxy-4'(5')-bromo-phenoxymethyl] - isoxazole and β-dimethylamino-ethyl chloride.

EXAMPLE 5

Using a procedure analogous to that described in Example 1, *3-methyl - 5 - [2'-(β-dimethylamino-ethoxy)-4'(5')-methyl-phenoxymethyl]-isoxazole* and its hydrochloride, m.p. 93–94° C. (recrystallized from acetone/ether), were prepared from 3-methyl - 5 - [2'-hydroxy-4'(5')-methyl-phenoxymethyl]-isoxazole and β-dimethylamino-ethyl chloride.

EXAMPLE 6

Using a procedure analogous to that described in Example 1, *3-methyl - 5 - [2'-(β-dimethylamino-ethoxy)-4'(5')-tert.butyl-phenoxymethyl] - isoxazole* and its hydrochloride, m.p. 95–96° C. (recrystallized from acetone/ether), were prepared from 3-methyl-5-[2'-hydroxy-4'(5')-tert.butyl-phenoxymethyl]-isoxazole and β-dimethylamino-ethyl chloride.

EXAMPLE 7

Using a procedure analogous to that described in Example 1, *3-ethyl - 5 - [2'-(β-dimethylamino-ethoxy)-phenoxymethyl]-isoxazole* and its hydrochloride, m.p. 97–98° C. (recrystallized from ethanol/ether), were prepared from 3-ethyl - 5 - [2'-hydroxy-phenoxymethyl]-isoxazole and β-dimethylamino ethyl chloride.

EXAMPLE 8

Using a procedure analogous to that described in Example 1, *3-n-propyl - 5 - [2'-(β-dimethylamino-ethoxy)-phenoxymethyl]-isoxazole* and its hydrochloride, m.p. 112–113° C. (recrystallized from ethanol/ether), were prepared from 3-n-propyl-5-[2'-hydroxy-phenoxymethyl]-isoxazole and β-dimethylamino-ethyl chloride.

EXAMPLE 9

Using a procedure analogous to that described in Example 1, 3-methyl - 5 - [2'-(2''-dimethylamino-1''-methyl-ethoxy)-phenoxymethyl]-isoxazole and its hydrochloride, m.p. 122–123° C. (recrystallized from ethanol/ether), of the formula

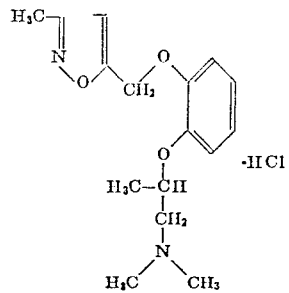

were prepared from 3-methyl - 5 - [2'-hydroxy-phenoxymethyl]-isoxazole and 1-dimethylamino-2-chloro-n-propane.

EXAMPLE 10

Using a procedure analogous to that described in Example 1, 3-methyl - 5 - [2'-(β-pyrrolidino-ethoxy)-phenoxymethyl]-isoxazole and its hydrochloride, m.p. 130–131° C. (recrystallized from ethanol/ether), of the formula

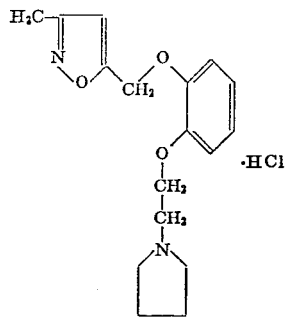

were prepared from 3-methyl - 5 - [2'-hydroxy-phenoxymethyl]-isoxazole and β-pyrrolidino-ethyl chloride.

EXAMPLE 11

Using a procedure analogous to that described in Example 1, 3-methyl - 5 - [2'-(β-piperidino-ethoxy)-phenoxymethyl]isoxazole and its hydrochloride, m.p. 127–128° C. (recrystallized from ethanol/ether), of the formula

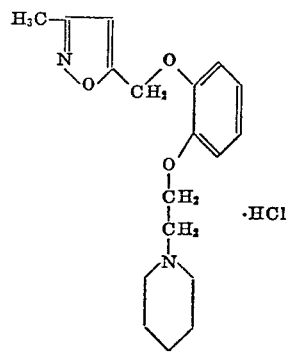

were prepared from 3-methyl - 5 - [2'-hydroxy-phenoxymethyl]-isoxazole and β-piperidino-ethyl chloride.

EXAMPLE 12

Using a procedure analogous to that described in Example 1, 3-methyl - 5 - [2'-(β-morpholino-ethoxy)-phenoxymethyl]-isoxazole and its hydrochloride, m.p. 127–

128° C. (recrystallized from ethanol/ether), of the formula

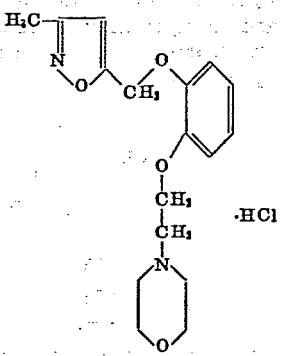

were prepared from 3-methyl - 5 - [2'-hydroxy-phenoxymethyl]-isoxazole and β-morpolino-ethyl chloride.

EXAMPLE 13

3-Methyl-5-[2'-(γ-dimethylamino-n-propoxy) - phenoxymethyl]-isoxazole and its hydrochloride by method A 10.3 gm. (0.05 mol) of 3-methyl-5-(o-hydroxyphenoxymethyl)-isoxazole and 4 gm. (0.1 mol) of sodium hydroxide were dissolved in 40 cc. of aqueous 50% ethanol, and, while stirring the solution, 15 gm. (0.05 mol) of N,N-dimethyl - 3 - (p-tolylsulfonyloxy)-n-propyl-amine hydrochloride were added thereto in small portions. The resulting mixture was heated for 30 minutes on a boiling water bath and then evaporated. The residue was taken up in 50 cc. of water, the aqueous solution was extracted with ethyl acetate, and the extract was dried over sodium sulfate and evaporated. The residue, raw 3-methyl-5-[2'-(γ-dimethylamino - n - propoxy)-phenoxymethyl]-isoxazole, was digested with ether, the mixture was filtered, the filtrate was acidified with ethereal hydrochloric acid, and the precipitate formed thereby was collected. 4 gm. (25% of theory) of the compound having a melting point of 105° C. of the formula

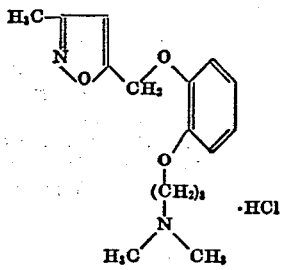

were obtained.

*Analysis:* $C_{16}H_{23}ClN_2O_3$; mol. wt. 326.8
 Calculated: C—58.70%; H—7.09%; N—8.56%; Cl—10.85%
 Found: C—58.50%; H—7.08%; N—8.67%; Cl—10.65%

The starting compound, N,N-dimethyl-3-(p-tolylsulfonyloxy)-n-propylamine hydrochloride, is described in J. Pharm. Soc. Japan *76,* 637–640 (1956); C.A. *51,* 424e.

EXAMPLE 14

3-Methyl-5-[2'-(β-pyrrolidino-ethoxy)-phenoxymethyl]-isoxazole and its hydrochloride by method B 15.0 gm. of 3 - methyl - 5 - [2'-(β-p-tolylsulfonyloxyethoxy)-phenoxymethyl]-isoxazole were added to 100 gm. of pyrrolidine, the mixture was heated at 90° C. for 20 hours, and then the excess pyrrolidine was distilled off. The residue was taken up in water, the aqueous solution was extracted with ether, and the ethereal extract was dried over sodium sulfate and then evaporated. The residue, raw 3-methyl-5-[2'-(β-pyrrolidino-ethoxy)-phenoxymethyl]-isoxazole, was dissolved in a small amount of ethanol, the resulting solution was acidified with ethereal hydrochloric acid, and the crystalline precipitate formed thereby was collected and recrystallized from ethanol/ether. 5.8 gm. (45% of theory) of the hydrochloride, m.p. 130–131° C., were obtained. The salt was identical to that obtained in Example 10.

*Analysis:* $C_{17}H_{23}ClN_2O_3$; mol. wt. 338.8
 Calculated: C—60.20%; H—6.84%; N—8.27%; Cl—10.46%
 Found: C—60.00%; H—6.88%; N—8.54% Cl—10.68%.

EXAMPLE 15

Using a procedure analogous to that described in Example 14, 3-methyl-5-[2'(β-diethylamino-ethoxy)-phenoxymethyl]-isoxazole and its hydrochloride, m.p. 87–88° C. (recrystallized from ethanol/ether), of the formula

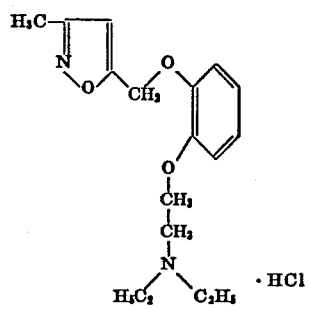

were prepared from 3-methyl-5-[2'-(β-p-tolylsulfonyloxyethoxy)-phenoxymethyl]-isoxazole and diethylamine.

EXAMPLE 16

Using a procedure analogous to that described in Example 14, 3 - methyl - 5 - [2'-(β-N'-methylpiperazinoethoxy)-phenoxymethyl]-isoxazole and its dihydrochloride, m.p. 180–181° C. (recrystallized from ethanol), of the formula

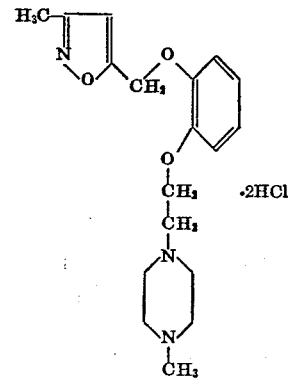

were prepared from 3-methyl-5-[2'-(β-p-tolylsulfonyloxyethoxy)-phenoxymethyl]-isoxazole and N-methyl-piperazine.

EXAMPLE 17

Using a procedure analogous to that described in Example 14, *3 - methyl- 5 -[2'-(β-di-n-butylamino-ethoxy)-phenoxymethyl]-isoxazole* and its hydrochloride, m.p. 97–98° C. (recrystallized from ethanol/ether), were prepared from 3-methyl-5-[2'-(β-p-tolylsulfonyloxy-ethoxy)-phenoxymethyl]-isoxazole and di-n-butylamine.

EXAMPLE 18

Using a procedure analogous to that described in Example 14, 3-methyl-5-[2'-(β-methylamino-ethoxy)-phenoxymethyl]-isoxazole and its hydrochloride, m.p. 106–107° C. (recrystallized from ethanol/ether), of the formula

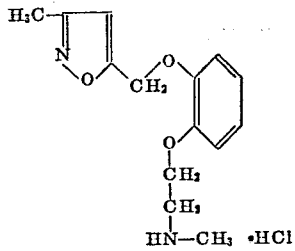

were prepared from 3-methyl-5-[2'-(β-p-tolylsulfonyloxy-ethoxy)-phenoxymethyl]-isoxazole and methylamine.

EXAMPLE 19

Using a procedure analogous to that described in Example 14, *3-methyl-5-[2'-(β-n-butylamino-ethoxy)phenoxymethyl]-isoxazole* and its hydrochloride, m.p. 85–86° C. (recrystallized from ethanol/ether), were prepared from 3-methyl-5-[2'-(β-p-tolylsulfonyloxy-ethoxy)-phenoxymethyl]-isoxazole and n-butylamine.

EXAMPLE 20

Using a procedure analogous to that described in Example 14, *3-methyl-5-[2'-(β-n-hexylamino-ethoxy)-phenoxymethyl]-isoxazole* and its hydrochloride, m.p. 104–105° C. (recrystallized from ethanol/ether), were prepared from 3-methyl-5-[2'-(β-p-tolylsulfonyloxy-ethoxy)-phenoxymethyl]-isoxazole and n-hexylamine.

EXAMPLE 21

Using a procedure analogous to that described in Example 14, *3-methyl-5-[2'-(β-isopropylamino-ethoxy)phenoxymethyl]-isoxazole* and its hydrochloride, m.p. 122–123° C. (recrystallized from ethanol/ether), were prepared from 3-methyl-5-[2'-(β-bromo-ethoxy)-phenoxymethyl]-isoxazole and ethanolic isopropylamine.

EXAMPLE 22

Using a procedure analogous to that described in Example 14, 3-methyl-5-[2'-(β-piperazino-ethoxy)phenoxymethyl]-isoxazole and its dihydrochloride, m.p. 128–129° C. (recrystallized from ethanol/ether), of the formula

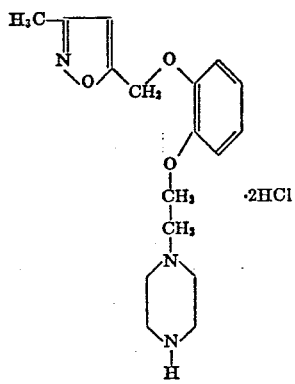

were prepared from 3-methyl-5-[2'-(β-bromo-ethoxy)-phenoxymethyl]-isoxazole and ethanolic piperazine.

EXAMPLE 23

Using a procedure analogous to that described in Example 14, 3-methyl-5-[2'-(β-amino-ethoxy)-phenoxymethyl]-isoxazole and its hydrochloride, m.p. 116° C. (recrystallized from ethanol/ether), of the formula

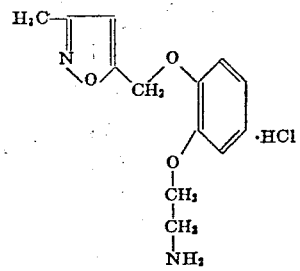

were prepared from 3-methyl-5-[2'-(β-bromo-ethoxy)phenoxymethyl]-isoxazole and ethanolic ammonia.

EXAMPLE 24

Using a procedure analogous to that described in Example 14, 3-methyl-5-[2'-(δ-dimethylamino-n-butoxy)-phenoxymethyl]-isoxazole and its hydrochloride, m.p. 90–91° C. (recrystallized from ethanol/ether), of the formula

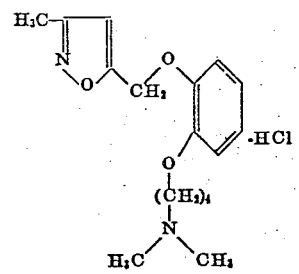

were prepared from 3-methyl-5-[2'-(δ-bromo-n-butoxy)-phenoxymethyl]-isoxazole and dimethylamine.

The compounds according to the present invention, that is, those embraced by formula I above and their non-toxic, pharmacologically acceptable acid addition salts, have useful pharmacodynamic properties. More particularly, the compounds of the instant invention exhibit very effective hypotensive and sedative activities in warm-blooded animals, such as cats.

The hypotensive activity of the compounds of the invention was ascertained by intravenously administering them to anesthetized cats. These tests showed that the compounds produced a reduction in the blood pressure of as much as 50 mm. Hg at dosage levels of as low as 0.5 mgm./kg. which generally lasted for more than one hour. The following compounds were found to be particularly effective hypotensives:

3-Methyl-5-[2'-(β-dimethylamino-ethoxy)-phenoxymethyl]-isoxazole hydrochloride,
3-Ethyl-5-[2'-(β-dimethylamino-ethoxy)-phenoxymethyl]-isoxazole hydrochloride,
3-Methyl-5-[2'-(β-pyrrolidino-ethoxy)-phenoxymethyl]-isoxazole hydrochloride,
3-Methyl-5-[2'-(β-dimethylamino-ethoxy)-4'(5')-chlorophenoxymethyl]-isoxazole hydrochloride,
3-Methyl-5-[2'-(β-n-butylamino-ethoxy)-phenoxymethyl]-isoxazole hydrochloride,
3-Methyl-5-[2'-(β-methylamino-ethoxy)-phenoxymethyl]isoxazole hydrochloride,
3-Methyl-5-[2'-(δ-dimethylamino-n-butoxy)-phenoxymethyl]-isoxazole hydrochloride, and
3-Methyl-5-[2'-(β-dimethylamino-ethoxy)-4'(5')-methylphenoxymethyl]-isoxazole hydrochloride.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.083 to 1.67 mgm./kg. body weight. The daily dose rate is from 0.166 to 3.34 mgm./kg. body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 25

Tablets

The tablet composition is compounded from the following ingredients:

|  | Parts |
|---|---|
| 3-Methyl-5-[2'-($\beta$-dimethylamino-ethoxy)-phenoxymethyl]-isoxazole hydrochloride | 50.0 |
| Lactose | 70.0 |
| Corn starch | 74.0 |
| Polyvinylpyrrolidone | 5.0 |
| Cellulose, microcrystalline | 20.0 |
| Magnesium stearate | 1.0 |
| Total | 220.0 |

Preparation

The isoxazole compound, the lactose and the corn starch are intimately admixed with each other, the mixture is moistened with an ethanolic 15% solution of the polyvinylpyrrolidone, the moist mass is forced through a 1.5 mm. mesh-screen, the resulting granulate is dried at 45° C., again passed through the screen and admixed with the cellulose and the magnesium stearate, and the composition is compressed into 220-mgm.-tablets in a conventional tablet making machine. Each tablet contains 50 mgm. of the isoxazole compound and is an oral dosage unit composition with effective hypotensive and sedative actions.

EXAMPLE 26

Coated pills

The pill core composition is compounded from the following ingredients:

|  | Parts |
|---|---|
| 3-Methyl-5-[2'-($\beta$-dimethylamino-ethoxy)-phenoxymethyl]-isoxazole hydrochloride | 25.0 |
| Lactose, powdered | 50.0 |
| Potato starch | 35.0 |
| Colloidal silicic acid | 5.0 |
| Soluble starch | 4.0 |
| Magnesium stearate | 1.0 |
| Total | 120.0 |

Preparation

The isoxazole compound, the lactose, the potato starch and the silicic acid are intimately admixed with each other, the mixture is moistened with an aqueous 20% solution of the soluble starch, the moist mass is forced through a 1.5 mm.-mesh screen. the resulting granulate is dried at 45° C., again passed through the screen and admixed with the magnesium stearate, and the composition is compressed into 120 mgm.-pill cores, which are subsequently coated with a thin shell consisting essentially of a mixture of sugar and talcum and finally polished with beeswax. Each coated pill contains 25 mgm. of the isoxazole compound and is an oral dosage unit composition with effective hypotensive and sedative actions.

EXAMPLE 27

Hypodermic solution

The solution is compounded from the following ingredients:

|  | Parts by vol. |
|---|---|
| 3-Methyl-5-[2'-($\beta$-dimethylamino - ethoxy)-phenoxymethyl] - isoxazole hydrochloride | 10.0 |
| Sorbitol | 50.0 |
| Distilled water | Q.s. ad 1,000.0 |

Preparation

The isoxazole compound and the sorbitol are dissolved in a sufficient amount of distilled water, the solution is diluted with additional distilled water to the indicated volume and then filtered until free from suspended particles, and the filtrate is filled into 1 cc.-ampules, which are subsequently sealed and sterilized at 120° C. for 20 minutes. Each ampule contains 10 mgm. of the isoxazole compounds, and the contents thereof are an injectable dosage unit composition with effective hypotensive and sedative actions.

EXAMPLE 28

Drop solution

The solution is compounded from the following ingredients:

|  | Parts by vol. |
|---|---|
| 3-Methyl-5-[2'-($\beta$-dimethylamino-ethoxy)-phenoxymethyl]-isoxazole hydrochloride | 5.0 |
| Methyl p-hydroxy-benzoate | 0.035 |
| Propyl p-hydroxy-benzoate | 0.015 |
| Oil of anise | 0.05 |
| Menthol | 0.06 |
| Saccharin sodium | 1.0 |
| Glycerin | 10.0 |
| Ethanol | 40.0 |
| Distilled water | q.s. ad 100.0 |

Preparation

The benzoates are dissolved in the ethanol, and the oil of anise and the menthol are stirred into the solution. The isoxazole compound, the glycerin and the saccharin sodium are dissolved in the distilled water, and the aqueous solution is blended into the ethanolic solution. The resulting solution is then filtered until clear. 0.5 ml. (about 10 drops) of the filtrate contain 25 mgm. of the isoxazole compound and is an oral dosage unit composition with effective hypotensive and sedative actions.

Analogous results are obtained when any one of the other isoxazole compounds embraced by formula I or a nontoxic acid addition salt thereof is substituted for the particular isoxazole compound in Examples 25 through 28. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

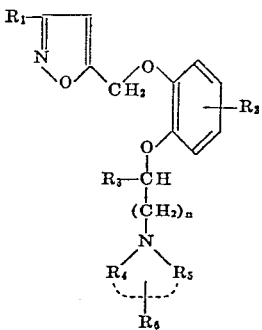

wherein
$R_1$ is alkyl of 1 to 3 carbon atoms,
$R_2$ is hydrogen, halogen or alkyl of 1 to 4 carbon atoms,
$R_3$ is hydrogen or methyl,
$R_4$ and $R_5$ are each hydrogen, alkyl of 1 to 6 carbon atoms or, together with each other and the nitrogen atom to which they are attached, morpholino, piperazino, pyrrolidino or piperidino,
$R_6$ is hydrogen or methyl, and
$n$ is an integer from 1 to 3, inclusive,
or a non-toxic, pharmacologically acceptable acid addition salt thereof.

2. A compound according to claim 1, which is 3-methyl - 5 - [2' - ($\beta$ - dimethylamino-ethoxy)-phenoxymethyl]-isoxazole or a non-toxic, pharmacologically acceptable acid addition salt thereof.

3. A compound according to claim 1, which is 3-ethyl-5 - [2'-($\beta$-dimethylamino-ethoxy)-phenoxymethyl]-isoxazole or a non-toxic, pharmacologically acceptable acid addition salt thereof.

4. A compound according to claim 1, which is 3-methyl - 5 - [2'-($\beta$-pyrrolidino-ethoxy)-phenoxymethyl]-isoxazole or a non-toxic, pharmacologically acceptable acid addition salt thereof.

5. A compound according to claim 1, which is 3-methyl - 5 - [2' - ($\beta$ - n - butylamino - ethoxy)-phenoxymethyl]-isoxazole or a non-toxic, pharmacologically acceptable acid addition salt thereof.

6. A compound according to claim 1, which is 3-methyl - 5 - [2' - ($\beta$ - methylamino - ethoxy)-phenoxymethyl]-isoxazole or a non-toxic, pharmacologically acceptable acid addition salt thereof.

7. A compound according to claim 1, which is 3-methyl - 5 - [2' - ($\delta$ - dimethylamino-n-butoxy)-phenoxymethyl[-isoxazole or a non-toxic, pharmacologically acceptable acid addition salt thereof.

References Cited
UNITED STATES PATENTS
3,321,474   5/1967   Kano et al. _____ 260—247.5

DONALD G. DAUS, Primary Examiner
R. V. RUSH, Assistant Examiner

U.S. Cl. X.R.
260—247.5 R, 268 H, 293.67; 424—248, 250, 267, 272